(12) United States Patent
Zak et al.

(10) Patent No.: US 10,691,967 B2
(45) Date of Patent: *Jun. 23, 2020

(54) DISTANCE ESTIMATION USING MULTI-CAMERA DEVICE

(71) Applicant: Snap Inc., Santa Monica, CA (US)

(72) Inventors: Eyal Zak, Megiddo (IL); Ozi Egri, Yassur (IL)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/591,292

(22) Filed: Oct. 2, 2019

(65) Prior Publication Data

US 2020/0042815 A1 Feb. 6, 2020

Related U.S. Application Data

(63) Continuation of application No. 16/219,519, filed on Dec. 13, 2018, now Pat. No. 10,467,492, which is a
(Continued)

(51) Int. Cl.
*G06K 9/00* (2006.01)
*G06K 9/20* (2006.01)
(Continued)

(52) U.S. Cl.
CPC ............ *G06K 9/209* (2013.01); *G01C 3/08* (2013.01); *G01C 3/085* (2013.01); *G03B 35/02* (2013.01);
(Continued)

(58) Field of Classification Search
CPC .... G06T 5/50; G06T 7/50; G06T 7/55; G06T 7/593; G06T 2200/24; G06T 2207/10012;
(Continued)

(56) References Cited

U.S. PATENT DOCUMENTS 6,038,295 A 3/2000 Mattes
6,980,909 B2 12/2005 Root et al.
(Continued)

FOREIGN PATENT DOCUMENTS

CA 2887596 A1 7/2015
CN 1934584 A 3/2007
(Continued)

OTHER PUBLICATIONS

"U.S. Appl. No. 14/783,119, 312 Amendment filed Dec. 5, 2018", 8 pgs.
(Continued)

*Primary Examiner* — Eric Rush
(74) *Attorney, Agent, or Firm* — Schwegman Lundberg & Woessner, P.A.

(57) ABSTRACT

A method and apparatus for measuring a distance to an object, be a device (100) having at least two cameras (104, 106), is described. One or more first images including the object are acquired by a first camera of the device and one or more first reference images are acquired by a second camera of the device, while the device is in a first position. One or more second images including the object and one or more second reference images are acquired by cameras of the device, while the device is in a second position, different from the first position. Based on the first and second reference images, information on the displacement of at least one camera of the device between the first and second position are determined. The distance from the device to the object is calculated based on the first and second images including the object and the determined information on the displacement of the at least one camera.

20 Claims, 3 Drawing Sheets

Related U.S. Application Data continuation of application No. 14/783,119, filed as application No. PCT/IB2014/060462 on Apr. 6, 2014, now Pat. No. 10,192,312.

(60) Provisional application No. 61/809,464, filed on Apr. 8, 2013, provisional application No. 61/809,447, filed on Apr. 8, 2013.

(51) Int. Cl.

| | | |
|---|---|---|
| G03B 35/02 | (2006.01) | |
| G03B 35/10 | (2006.01) | |
| G06K 9/22 | (2006.01) | |
| G01C 3/08 | (2006.01) | |
| G06T 7/593 | (2017.01) | |
| H04N 5/225 | (2006.01) | |

(52) U.S. Cl.
CPC .............. *G03B 35/10* (2013.01); *G06K 9/22* (2013.01); *G06T 7/593* (2017.01); *H04N 5/2252* (2013.01); *H04N 5/2258* (2013.01); *G06T 2200/24* (2013.01); *G06T 2207/10016* (2013.01); *G06T 2207/20221* (2013.01); *G06T 2207/30041* (2013.01); *G06T 2207/30244* (2013.01)

(58) Field of Classification Search
CPC . G06T 2207/10016; G06T 2207/10028; G06T 2207/20212; G06T 2207/20216; G06T 2207/20221; G06T 2207/20228; G06T 2207/30041; G06T 2207/30244; G06K 9/00221; G06K 9/00228; G06K 9/00597; G06K 9/209; G06K 9/22; G06K 9/36; G03B 13/16; G03B 13/18; G03B 35/00; G03B 35/02; G03B 35/04; G03B 35/06; G03B 35/08; G03B 35/10; H04N 5/2252; H04N 5/2258; H04N 13/0207; H04N 13/021; H04N 13/0221; H04N 13/026; H04N 13/0282; H04N 13/0285; G01C 3/08; G01C 3/085
USPC ....... 382/100, 106, 154, 254, 255, 276, 284, 382/291, 294, 312, 313; 348/42, 46, 50, 348/135, 140, 142; 396/89, 147–150, 396/281, 296, 322–325, 332
See application file for complete search history.

(56) References Cited

U.S. PATENT DOCUMENTS

| | | |
|---|---|---|
| 7,173,651 B1 | 2/2007 | Knowles |
| 7,411,493 B2 | 8/2008 | Smith |
| 7,535,890 B2 | 5/2009 | Rojas |
| 8,131,597 B2 | 3/2012 | Hudetz |
| 8,199,747 B2 | 6/2012 | Rojas et al. |
| 8,259,161 B1 | 9/2012 | Huang et al. |
| 8,332,475 B2 | 12/2012 | Rosen et al. |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root et al. |
| 8,937,646 B1 | 1/2015 | Baldwin |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,223,404 B1 | 12/2015 | Ivanchenko |
| 9,443,227 B2 | 9/2016 | Evans et al. |
| 9,489,661 B2 | 11/2016 | Evans et al. |
| 9,491,134 B2 | 11/2016 | Rosen et al. |
| 10,192,312 B2 | 1/2019 | Zak et al. |
| 10,467,492 B2 | 11/2019 | Zak et al. |
| 2005/0270368 A1 | 12/2005 | Hashimoto |
| 2007/0019000 A1 | 1/2007 | Motomura et al. |
| 2008/0137940 A1 | 6/2008 | Kakinami et al. |
| 2010/0074609 A1 | 3/2010 | Kasama et al. |
| 2010/0157128 A1 | 6/2010 | Choi et al. |
| 2011/0025829 A1 | 2/2011 | Mcnamer et al. |
| 2011/0141227 A1 | 6/2011 | Bigioi et al. |
| 2011/0202598 A1 | 8/2011 | Evans et al. |
| 2011/0255775 A1 | 10/2011 | Mcnamer et al. |
| 2011/0304711 A1 | 12/2011 | Ito et al. |
| 2012/0002019 A1 | 1/2012 | Hashimoto et al. |
| 2012/0147139 A1 | 6/2012 | Li et al. |
| 2012/0209924 A1 | 8/2012 | Evans et al. |
| 2012/0224032 A1* | 9/2012 | Takiguchi ................. G06T 7/33 348/47 |
| 2012/0242794 A1 | 9/2012 | Park et al. |
| 2012/0287243 A1 | 11/2012 | Parulski |
| 2012/0314036 A1 | 12/2012 | Dahi et al. |
| 2013/0201301 A1 | 8/2013 | Huang et al. |
| 2013/0229529 A1 | 9/2013 | Lablans |
| 2014/0029837 A1 | 1/2014 | Venkatraman et al. |
| 2014/0226864 A1 | 8/2014 | Venkatraman et al. |
| 2014/0240471 A1 | 8/2014 | Srinivasa et al. |
| 2014/0285637 A1 | 9/2014 | Cheng et al. |
| 2014/0300722 A1* | 10/2014 | Garcia ...................... G06T 7/62 348/77 |
| 2015/0002633 A1 | 1/2015 | Hayashi et al. |
| 2015/0124059 A1 | 5/2015 | Georgiev et al. |
| 2015/0285631 A1 | 10/2015 | Kubota et al. |
| 2015/0310619 A1 | 10/2015 | Cao |
| 2016/0048968 A1 | 2/2016 | Egri et al. |
| 2019/0130201 A1 | 5/2019 | Zak et al. |

FOREIGN PATENT DOCUMENTS

| | | |
|---|---|---|
| CN | 102550015 A | 7/2012 |
| CN | 103017730 A | 4/2013 |
| CN | 202940864 U | 5/2013 |
| CN | 105339756 A | 2/2016 |
| DE | 10334213 A1 | 7/2004 |
| EP | 2927634 A2 | 10/2015 |
| KR | 1020130022831 A | 3/2013 |
| WO | WO-2010149854 A1 | 12/2010 |

OTHER PUBLICATIONS

"U.S. Appl. No. 14/783,119, Advisory Action dated Aug. 7, 2018", 4 pgs.

"U.S. Appl. No. 14/783,119, Final Office Action dated May 10, 2018", 42 pgs.

"U.S. Appl. No. 14/783,119, Non Final Office Action dated Oct. 5, 2017", 40 pgs.

"U.S. Appl. No. 14/783,119, Notice of Allowance dated Sep. 6, 2018", 11 pgs.

"U.S. Appl. No. 14/783,119, Notice of Allowance dated Sep. 24, 2018", 5 pgs.

"U.S. Appl. No. 14/783,119, Preliminary Amendment filed Oct. 8, 2015", 9 pgs.

"U.S. Appl. No. 14/783,119, PTO Response to Rule 312 Communication dated Dec. 19, 2018", 2 pgs.

"U.S. Appl. No. 14/783,119, Response filed Aug. 10, 2018 to Advisory Action dated Aug. 7, 2018", 16 pgs.

"U.S. Appl. No. 14/783,119, Response Filed Dec. 19, 2017 to Non Final Office Action dated Oct. 5, 2017", 21 pgs.

"U.S. Appl. No. 16/219,519, Non Final Office Action dated Mar. 8, 2019", 12 pgs.

"U.S. Appl. No. 16/219,519, Notice of Allowance dated Jun. 25, 2019", 13 pgs.

"U.S. Appl. No. 16/219,519, Preliminary Amendment filed Jan. 17, 2019 t", 4 pgs.

"U.S. Appl. No. 16/219,519, Response filed Jun. 10, 2019 to Non Final Office Action dated Mar. 8, 2019", 11 pgs.

(56) References Cited

OTHER PUBLICATIONS

"Chinese Application Serial No. 201480032676.7, Office Action dated Jan. 2, 2018", With English Translation, 28 pgs.
"Chinese Application Serial No. 201480032676.7, Office Action dated Apr. 26, 2017", with English Translation, 11 pgs.
"Chinese Application Serial No. 201480032676.7, Office Action dated Jun. 29, 2018", w/o English Translation, 11 pgs.
"Chinese Application Serial No. 201480032676.7, Office Action dated Dec. 28, 2018", w/ English Translation, 10 pgs.
"Chinese Application Serial No. 201480032676.7, Response filed Feb. 27, 2018 to Office Action dated Jan. 2, 2018", with English Translation, 17 pgs.
"Chinese Application Serial No. 201480032676.7, Response Filed Mar. 5, 2019 to Office Action dated Dec. 28, 2018", w/English Claims, 17 pgs.
"Chinese Application Serial No. 201480032676.7, Response filed Aug. 24, 2018 to Office Action dated Jun. 29, 2018", w/ English Claims, 19 pgs.
"Chinese Application Serial No. 201480032676.7, Response filed Aug. 29, 2017 to Office Action dated Apr. 26, 2017", 19 pgs.
"European Application Serial No. 14782545.9, Communication Pursuant to Article 94(3) EPC dated Feb. 15, 2018", 7 pgs.
"European Application Serial No. 14782545.9, Communication Pursuant to Article 94(3) EPC dated Nov. 12, 2018", 5 pgs.
"European Application Serial No. 14782545.9, Extended European Search Report dated Nov. 8, 2016", 8 pgs.
"European Application Serial No. 14782545.9, Response filed Mar. 20, 2019 to Communication Pursuant to Article 94(3) EPC dated Nov. 12, 2018", w/ English Claims, 31 pgs.
"European Application Serial No. 14782545.9, Response filed Jun. 22, 2018 to Communication Pursuant to Article 94(3) EPC dated Feb. 15, 2018", w/ English Claims, 18 pgs.
"International Application Serial No. PCT/IB2014/060462, International Preliminary Report on Patentability dated Oct. 22, 2015", 7 pgs.
"International Application Serial No. PCT/IB2014/060462, International Search Report dated Aug. 10, 2014", 4 pgs.
"International Application Serial No. PCT/IB2014/060462, Written Opinion dated Aug. 10, 2014", 5 pgs.
Alvertos, N, et al., "Correspondence in Paris of Images Acquired by Camera Displacement in Depth", SPIE, Intelligent Robots and Computer Vision, vol. 726, (1986), 131-136.
Holzmann, C, et al., "Measuring distance with mobile phones using single-camera stereo vision", Distributed Computing Systems Workshops (ICDCSW), 2012 32nd International Conference on, (2012), 88-93 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
U.S. Appl. No. 14/783,119, U.S. Pat. No. 10,192,312, filed Oct. 8, 2015, Distance Estimation Using Multi-Camera Device.
U.S. Appl. No. 16/219,519, U.S. Pat. No. 10,467,492, filed Dec. 13, 2018, Distance Estimation Using Multi-Camera Device.
"Chinese Application Serial No. 201910630729.X, Voluntary Amendment Filed Feb. 28, 2020", with English Claims, 16 pgs.

\* cited by examiner

DISTANCE ESTIMATION USING MULTI-CAMERA DEVICE

RELATED APPLICATIONS

This application is a continuation of and claims priority to U.S. patent application Ser. No. 16/219,519, filed on Dec. 13, 2018, which is a continuation of and claims priority to U.S. patent application Ser. No. 14/783,119, filed Oct. 8, 2015, which is a § 371 National Stage Application and claims priority to PCT/IB2014/060462, filed Apr. 6, 2014, which claims priority to U.S. Provisional Patent Application Ser. No. 61/809,447, filed Apr. 8, 2013, and U.S. Provisional Patent Application Ser. No. 61/809,464, filed Apr. 8, 2013, each of which are incorporated herein by reference in their entirety.

FIELD OF THE INVENTION

The present invention relates to distance measurement and in particular to distance measurement by portable devices.

BACKGROUND OF THE INVENTION

Mobile devices, once used solely for telephone communications, are used for a wide range of tasks and include various apparatus.

Korean patent publication 2013/0022831 to Ryoo describes a method of measuring distance, height and length of an object using a mobile communication terminal.

Chinese patent publication 202940864 to Wu Hao describes incorporating a distance sensor into a mobile phone.

Chinese patent publication 10334213 to Liu Guohua describes measuring distance using two cameras with a known distance between them.

These devices either lack sufficient accuracy or require additional hardware not included in many existing mobile devices.

SUMMARY OF THE INVENTION

An aspect of some embodiments of the present invention relates to using a mobile device with a front camera and a rear camera to calculate the distance to an imaged object.

The distance to an object is optionally calculated by achieving two object images and two corresponding reference images, each pair of corresponding images being acquired from a different position. The disparity and/or distance in pixels and/or in the real world, between the different positions is determined, and accordingly the distance is calculated by triangulation.

There is therefore provided in accordance with embodiments of the present invention, a method of measuring a distance to an object, by a device having at least two cameras, comprising acquiring one or more first images including the object by a first camera of the device and one or more first reference images by a second camera of the device, while the device is in a first position, acquiring one or more second images including the object and one or more second reference images, by cameras of the device, while the device is in a second position, different from the first position, determining, based on the first and second reference images, information on the displacement of at least one camera of the device between the first and second positions, and calculating the distance from the device to the object, based on the first and second images including the object and the determined information on the displacement of the at least one camera.

Optionally, acquiring the one or more second images including the object comprises acquiring by the first camera, through which the one or more first images of the object were acquired. Optionally, acquiring the one or more first images including the object comprises acquiring a plurality of images while the device is in the first position and generating a single image including the object from the plurality of acquired images. Optionally, generating a single image including the object from the plurality of acquired images comprises selecting one of the images.

Optionally, generating a single image including the object from the plurality of acquired images comprises generating a combination of some or all of the images and/or automatically analyzing the quality of the acquired images and discarding images of a quality below a given threshold. Optionally, the method includes displaying to a user instructions directing to change the position of the device to the second position, after acquiring the one or more first images. Optionally, displaying the instructions comprises displaying an indication of an extent of matching of a current image acquired by the second camera, to the first reference image. Optionally, the method includes displaying, to a user, a video stream acquired by the second camera, after acquiring the one or more first images, so that the user can use the video stream in directing the device to the second position.

Optionally, determining information on the displacement of the at least one camera of the device comprises comparing the size of a body organ shown in both the first and second reference images. Optionally, determining information on the displacement of the at least one camera of the device comprises comparing the size of a cornea shown in both the first and second reference images. Optionally, determining information on the displacement of the at least one camera of the device comprises determining an extent of relative rotation between the first and second reference images.

Optionally, determining information on the displacement of the at least one camera of the device comprises determining based on a known distance between the first and second cameras. Optionally, the first and second cameras are on opposite sides of the device. Optionally, the one or more first images including the object and the one or more first reference images are acquired in pairs of reference and object images, the images of each pair being acquired substantially concurrently within less than 1 second.

There is further provided in accordance with embodiments of the invention, a device, comprising: a housing, a first camera included in the housing, a second camera included in the housing; and a processor, included in the housing, configured to receive one or more first object images including an object, acquired by the first camera, and one or more second object images including the object, to receive one or more first reference images acquired by the second camera and one or more second reference images, to determine a displacement of at least one camera of the device between acquiring the first object image and acquiring the second object image, responsively to the first and second reference images, and to calculate the distance from the device to the object based on the first and second object images and the determined displacement.

Optionally, the first and second cameras are on opposite sides of the housing. Optionally, the processor is configured to control the first and second cameras to acquire the images in pairs of concurrently acquired object images and respective reference images. Optionally, the device includes a screen located on a same side of the housing as the second camera. Optionally, the processor is configured to provide, after receiving the one or more first object images and first reference images, instructions on changing the position of the housing, for acquiring the second object and second reference images. Optionally, the processor is configured to analyze an input stream provided by the second camera relative to the one or more first reference images, after receiving the one or more first object images and first reference images, in order to determine when the housing is in a position suitable for acquiring the second reference images and the second object images.

Optionally, the device includes a screen and wherein the processor is configured to display on the screen, after receiving the one or more first object images and first reference images, a stream of images acquired by the second camera, in order to allow a user to position the housing for acquiring the second images.

Optionally, the processor is configured to determine an extent of relative rotation between the first and second reference images and use the determined extent of relative rotation in determining the displacement of the at least one camera of the device between acquiring the first object image and acquiring the second object image.

Optionally, the processor is configured to determine the displacement by comparing the size of a body organ shown in both the first and second reference images.

There is further provided in accordance with embodiments of the invention, a computer program product for distance estimation comprising a computer readable non-transitory storage medium having computer readable program code embodied therewith, which when executed by a computer performs, receives one or more first images including an object and one or more first reference images, receives one or more second images including the object and one or more second reference image, determines, based on the first and second reference images, information on a displacement of at least one camera of a device between acquiring the one or more first and one or more second images, and calculates a distance from the device to the object, based on the first and second images including the object and the determined information on the displacement of the at least one camera.

BRIEF DESCRIPTION OF FIGURES

Exemplary non-limiting embodiments of the invention will be described with reference to the following description in conjunction with the figures. Identical structures, elements or parts which appear in more than one figure are preferably labeled with a same or similar number in all the figures in which they appear, in which.

DETAILED DESCRIPTION OF EMBODIMENTS

An aspect of some embodiments of the invention relates to a method of measuring a distance to an object by a mobile device including at least two cameras. At least two images including the object are acquired from respective different positions of the device. Substantially concurrently with acquiring the images including the object (referred to herein as "object images"), respective reference images are acquired by a different camera than the camera acquiring the respective object image. The reference images are used to determine the relative positions of the camera(s) when the at least two images of the object were acquired and using the at least two images and the relative positions of the cameras, the distance to the object is determined.

In some embodiments, the different positions of the cameras acquiring the images are achieved by rotating the device and positioning the camera acquiring the reference images such that the reference images are substantially identical. The relative position of the camera acquiring the object images can then be determined from the extent of rotation and the positions of the cameras on the device.

In other embodiments, the different positions of the cameras acquiring the images are achieved by changing the distance between the device and a user holding the device. The distances to the user holding the device is determined from the reference images.

The term device position is used herein to relate to both the location and orientation of the device, such that two different orientations of the device, even if the device is in the same location, are referred to herein as two different positions.

In some embodiments of the invention, the object images are all acquired by a first camera and the reference images are all acquired by a second camera. In other embodiments, however, a same camera of the device is used for one or more of the object images and one or more of the reference images.

Overview

Figure 1:
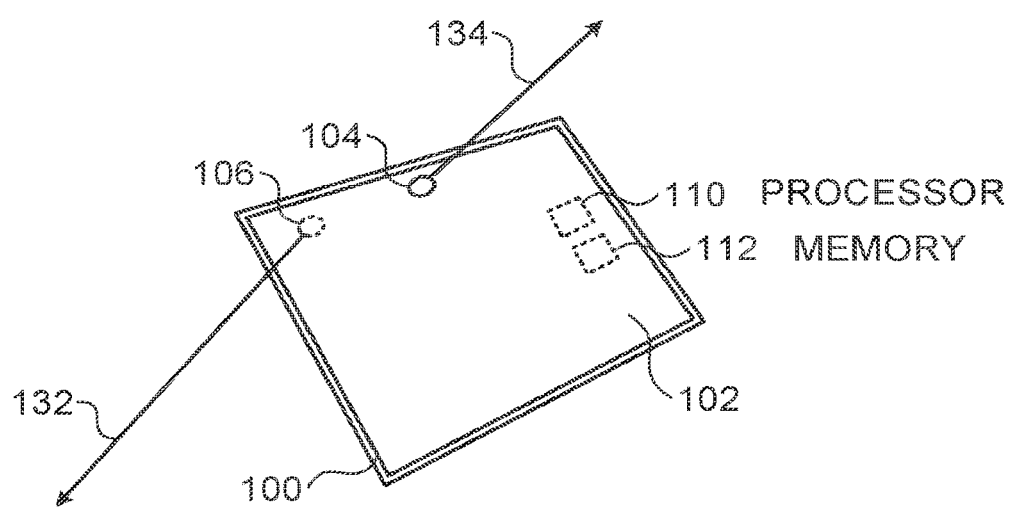
FIG. 1 is a schematic illustration of a mobile device 100 which may be configured to operate in accordance with an embodiment of the invention.

FIG. 1 is a schematic illustration of a mobile device 100 which may be configured to operate in accordance with an embodiment of the invention. Device 100 optionally comprises a touch screen 102, a front camera 104, having an imaging axis 134, on the same side as the touch screen 102 and a rear camera 106, having an imaging axis 132, directed in an opposite direction from front camera 104. A processor 110 and a memory 112 are embedded within mobile device 100. Processor 110 is configured with software to carry out distance estimation based on images acquired by front camera 104 and rear camera 106 as described herein below. Device 100 optionally comprises a smart-phone or tablet, although other devices having the elements discussed herein may also be used. Generally, processor 110 is configured to perform various tasks other than distance estimation, such as encoding and decoding speech signals, and/or any other tasks known to be performed by mobile devices.

The software may be downloaded to processor 110 in electronic form, over a network, for example, and stored in memory 112. Alternatively or additionally, the software may be held on tangible, non-transitory storage media, such as optical, magnetic, or electronic memory media. Further alternatively or additionally, at least some of the functions of processor 110 may be performed by dedicated or programmable hardware logic circuits.

Figure 2:
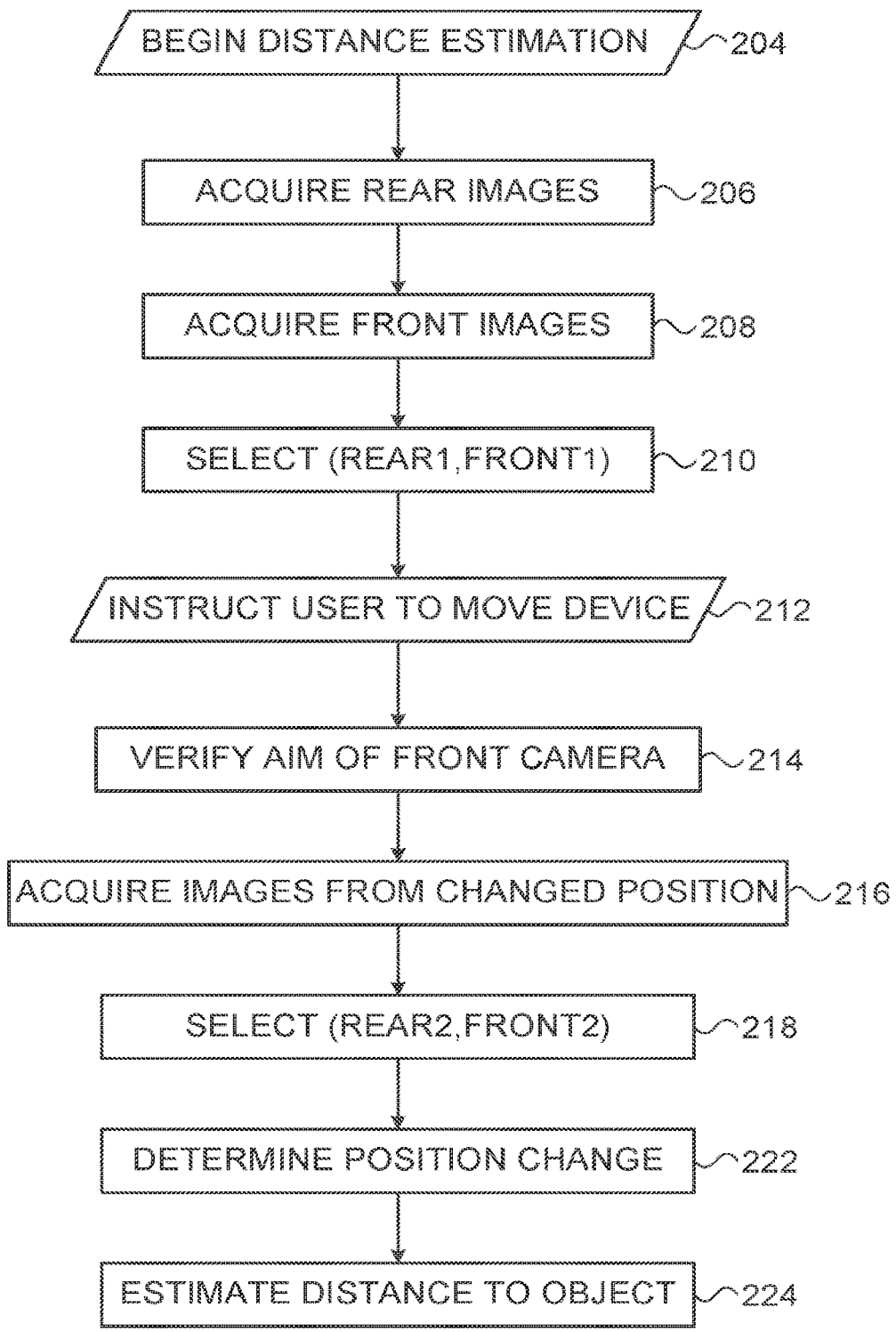
FIG. 2 is a flowchart of acts performed in estimating a distance to an object, in accordance with an embodiment of the invention.

FIG. 2 is a flowchart of acts performed in estimating a distance to an object, in accordance with an embodiment of the invention.

When mobile device 100 is instructed (204) to estimate a distance to an object, rear camera 106 is aimed at the object and mobile device 100 optionally begins to execute a software process that manages a distance estimation procedure. At the beginning of the estimation procedure, mobile device 100 acquires (206) one or more images through rear camera 106, which is aimed at the object, and in addition acquires (208) one or more images through front camera 104. Optionally, a single image pair, referred to herein as (Rear1, Front1), is selected (210) to represent the rear camera and front camera images.

Mobile device 100 then optionally instructs (212) the user to change the position or pose of mobile device 100 to a new position and aim front camera 104 in the same direction as before the change in position. Mobile device 100 optionally verifies (214) that front camera 104 is properly aimed and then acquires (216) one or more images by both the front and rear cameras. Mobile device 100 optionally selects (218) a single image acquired from the new position for each of the front and rear cameras. The selected pair of images from after the position change is referred to herein as (Rear2, Front2).

Mobile device 100 analyzes the selected images acquired before (Rear1, Front1) and after (Rear2, Front2) the position change, to determine (222) the change in position of the rear camera 106 due to the change in the position of mobile device 100. Based on the determined change in the position in the rear camera and the selected images of the object (Rear1 and Rear2) from before and after the change, the distance to the object is estimated (224), as detailed hereinbelow.

Alignment Instructions

In some embodiments of the invention, the instructions (212) to the user to change the position or pose of device 100 include a display of a current video stream acquired by front camera 104, allowing the user to adjust the position of front camera 104 according to the images it is currently acquiring.

Optionally, the instructions (212) to the user further include the selected (210) image acquired by front camera 104 before the position change (Front1), so the user can easily match the current position of front camera 104 to the selected (210) previously acquired image Front1. Optionally, the current video stream is overlaid on the displayed image Front1 to allow simple alignment by the user. Alternatively, the current video stream may be displayed side by side with image Front1, possibly with a suitable grid correlating between the images. Further alternatively or additionally, rather than displaying the Front1 image, a shadow or grid extracted from the Front1 image is displayed, and the user is requested to match the current video stream to the displayed shadow or grid.

Alternatively or additionally, processor 110 compares the images of an image stream currently collected by front camera 104 and the selected Front1 image, for example using feature matching, and accordingly provides aiming instructions, for example in the form of displayed arrows and/or other graphical guidance or spoken directions. The feature matching optionally includes selecting a feature appearing in both Front1 and the images of the currently collected image stream and determining the relative positions of the features in Front1 and the image stream.

In some embodiments of the invention, processor 110 calculates a numerical matching extent score and displays the calculated matching extent score to the user. Alternatively or additionally, processor 110 provides a stop instruction when the matching extent is above a predetermined threshold. The threshold may be a preconfigured threshold used universally, or may be a dynamically adjustable threshold according to a required accuracy level of the distance determination. In some embodiments of the invention, a relatively low threshold is required and processor 110 digitally compensates for the mismatch by performing image rectification, as described hereinbelow.

Optionally, the instructions (212) also request the user to remain still until the images are acquired, in order to minimize the position changes between acquiring (Rear1, Front1) and (Rear2, Front2).

Initiation and Utilization

The estimated distance is optionally provided to the user by display on screen 102, sounding to the user or any other suitable method. Alternatively or additionally, the distance may be used by processor 110 or provided to a different processor, for further calculations. Based on the distance to the object, processor 110 may optionally determine other sizes and/or distances in the scene, such as the size of the object and/or the distances and sizes of other objects in the images. Thus, device 100 may operate as a measurement tool. Alternatively or additionally, the distance estimation is used to apply scale-in augmented reality applications, for example in overlaying virtual objects on an image, stream of images or live scene. In some embodiments of the invention, the object size is used by processor 110 to improve object tracking between image frames in a video stream acquired by mobile device 100, for example in surveillance applications.

The instruction (204) to estimate a distance to an object is provided, in some embodiments, by a human user, who is aware of the estimation and participates knowingly in the process. In other embodiments, the instruction (204) to estimate a distance is provided automatically by another software running on device 100. In these embodiments, the user may participate knowingly in the process or may not be aware of the process. For example, the instruction (212) to move the device to a new position may be provided among other instructions provided by the other software initiating the distance estimation, such that the user does not necessarily know that the instructions are performed for distance estimation. Alternatively or additionally, the instruction (212) to change the position of device 100 is provided in an implied manner, without the user necessarily understanding that there was an instruction. For example, an image on screen 102 may be rotated in order to cause the user to instinctively rotate device 100.

Acquiring of Images

Referring in more detail to acquiring (206, 208, 216) images through front camera 104 and rear camera 106, in some embodiments of the invention, at least three, at least five or even at least ten images are acquired by each of the cameras in each of the acquiring sessions (e.g., before and after the position change). In some embodiments of the invention, the quality of the images are assessed as they are acquired and the image acquiring is repeated until an image, a predetermined number of images or pairs of front and rear images considered to have a sufficient quality, are acquired. Accordingly, in these embodiments, the number of acquired images varies according to the quality of the acquired images. Optionally, the same number of images is acquired by the front and rear cameras. Alternatively, more images are acquired by the rear camera 106, as the chances that the images of the rear camera are blurred or otherwise unsuitable are generally relatively higher than the chances that the front camera images are blurred. It is noted, however, that in cases in which front camera 104 is expected to have higher chances of providing unsuitable images, front camera 104 may be instructed to acquire more images than rear camera 106.

Optionally, in cases in which the front and rear images are acquired in pairs, the front and rear camera images of each pair are acquired simultaneously or within a very short time difference, such as within less than 5 seconds, less than 1 second, less than a half a second, possibly even less than 30 milliseconds.

Optionally, the same criterion is used in determining the number of images acquired before and after the position change of device 100. In some embodiments, in both image acquiring sessions, images are acquired until a predetermined number of images of sufficient quality were acquired. Alternatively, the same number of images is acquired before and after the position change. In other embodiments, more images are acquired before the position change or after the position change. In some embodiments of the invention, the quality assessment after the position change includes in addition to an objective quality, or instead of an objective quality, a matching measure indicative of the extent to which the image matches the images acquired before the position change.

Optionally, the image selection (210) of (Rear1, Front1) is performed based on quality assessment methods, such as verifying that the image has strong gradients and/or that the camera did not move while acquiring the picture (e.g., based on accelerometer measurements and/or image analysis). Optionally, the selection includes selecting Rear1 as the best quality image acquired before the position change by rear camera 106, and selecting the corresponding front camera image acquired at the same time to be Front1. Alternatively, after selecting Rear1, Front1 is selected among a limited number of images acquired within a short period of time before, in parallel to and/or after acquiring Rear1. Alternatively, the selection of Rear1 and Front1 is based on a weighted score giving different weight to the quality of the rear image and to the quality of the front image. In some embodiments, the time difference between acquiring each pair of images is also factored into the score.

Alternatively or additionally, the selection provides a combination of two or more images, for example generated as a weighted sum of the images or of those images considered having a quality above a given threshold. Optionally, low quality images (e.g., blurred images) are filtered out, and the weighted selected images are calculated only based on the images considered of sufficient quality.

The image selection (218) of (Rear2, Front2) may be performed in a manner similar to the selection (210) of (Rear1, Front1). Alternatively, Front2 is selected as the first image considered sufficiently aligned to Front1, which has a sufficient quality.

In some embodiments, processor 110 determines the location of the user relative to the background in the Front1 selected image, and analyzes the images acquired after the position change based on the extent to which the location of the user relative to the background in these images, matches the relative location in Front1. Optionally, the image acquired after the position change, which best matches Front1 is selected. Alternatively, analyzed images having a difference in location beyond a predetermined value are weeded out from consideration. Further alternatively, the extent to which the relative location of the user in the analyzed images matches that in Front1 is weighted into a quality score used in selecting Front2.

Optionally, if an image of sufficient quality and/or matching is not found among the images acquired after the position change, the user is requested to repeat the acquiring (216) of images after the position change or is requested to repeat the entire procedure of FIG. 2.

In some embodiments of the invention, processor 110 also verifies that the axis of the camera as determined from the rear camera images and/or front camera images did not change substantially between the acquiring of images before and after the position change. Alternatively or additionally, rectification is performed to compensate for movement of the camera axis, as detailed hereinbelow.

Distance Estimation

The estimation (224) optionally includes image rectification to correct for rotation bias of the images acquired before and after the position change of rear camera 106 (Rear1, Rear2). In the image rectification, Rear1 and Rear2 are adjusted such that they are both in the same plane. The rectification is performed using any suitable method known in the art, such as any of the methods described in US patent publication 2013/0271578, to Richards, US patent publication 2005/0180632 to Aradhye et al. and Lim, Ser-Nam; Mittal, Anurag; Davis. Larry; Paragios, Nikos., "Uncalibrated stereo rectification for automatic 3d surveillance". *International Conference on Image Processing* 2: 1357-1360, 2004, the disclosures of all of which are incorporated herein by reference in their entirety.

Processor 110 then optionally performs a triangulation method on the rectified versions of Rear1 and Rear2 to determine the distance to one or more points of interest in the images. The triangulation is performed using any suitable method known in the art, for example, using any of the methods described in Richard Hartley and Andrew Zisserman (2003). *Multiple View Geometry in computer vision*. Cambridge University Press, the disclosure of which is incorporated herein by reference. The triangulation is optionally based on the distance between the positions of the rear camera 106, before and after the position change, i.e., the positions of rear camera 106 at the time of acquiring Rear1 and Rear2, respectively, and the f-number, also referred to as focal ratio, of rear camera 106.

In some embodiments of the invention, estimation (224) includes creating a stereo or disparity image based on the Rear1, Rear2 images.

Rotation

Figure 3:
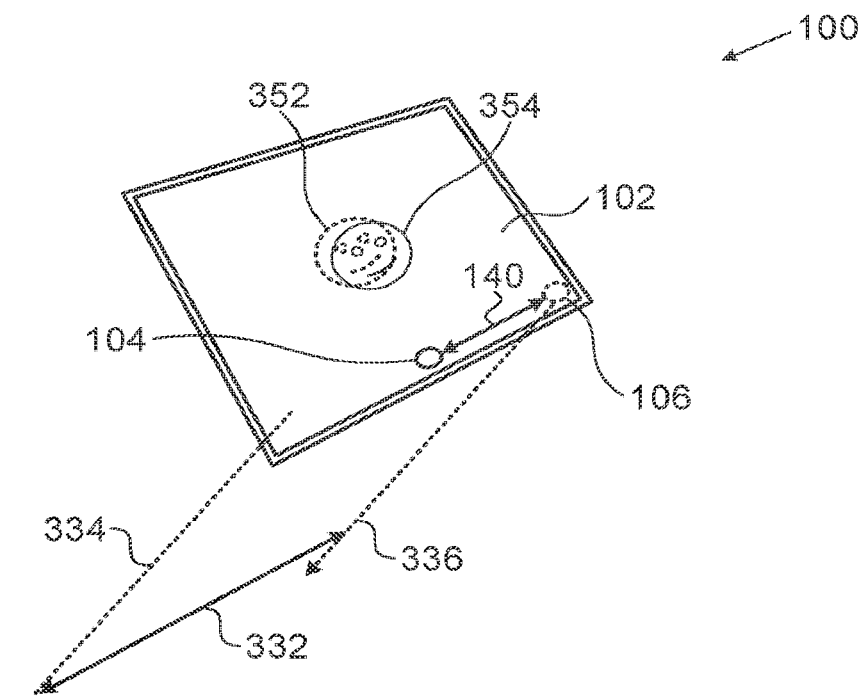
FIG. 3 is a schematic illustration of the mobile device in a rotated orientation relative to the orientation of FIG. 1, in accordance with an embodiment of the invention.

FIG. 3 is a schematic illustration of mobile device 100 in a rotated orientation relative to the orientation of FIG. 1, in accordance with an embodiment of the invention. In the embodiments described with reference to FIG. 3, the change in position of mobile device 100 is a rotation of the mobile device.

The instruction (212) to move mobile device 100 to the new position includes in these embodiments, an instruction to rotate the mobile device. Optionally, the user is instructed to position mobile device 100 such that the images acquired by front camera 104 in the new position, after the rotation, are the same as the images acquired before the rotation, adjusted for the extent of rotation of the mobile device 100. In some embodiments, the user is instructed to rotate mobile device 100 by 180 degrees, to achieve a maximal change in the position of rear camera 106 relative to front camera 104. In other embodiments, the user is instructed to rotate mobile device 100 by 90 degrees, or any other desired extent. For example, the user may be requested to rotate device 100 to an extent close to 180 degrees, for example between 160-200 degrees, thus allowing the user to perform the rotation quickly without accurately adjusting the rotation to 180 degrees.

When rotating by 180 degrees, as illustrated by FIG. 3 which shows device 100 rotated by 180 degrees relative to its position in FIG. 1, the distance 332 between the imaging axis of rear camera 106 before 334 and after 336 the rotation is twice the distance 140 between the locations of front camera 104 and rear camera 106, as front camera 104 remains in the same relative location before and after the rotation.

The determination (222) of the change in position of rear camera 106, is optionally based on the known positions of cameras 104 and 106 on device 100. In some embodiments of the invention, the determination includes estimation of the extent of rotation of mobile device 100, for example based on a comparison of the images taken by front camera 104 before and after the rotation. Alternatively or additionally, the estimation is based on a comparison of the images taken by rear camera 106 before and after the rotation. Further alternatively, the extent of the rotation is known from an angle measurement unit within device 100.

While in the above description front camera 104 is directed to the user before and after the rotation, in other embodiments, front camera 104 is directed at the object whose distance is to be determined before the rotation and is directed at the user after the rotation. This rotation is referred to herein as flipping. In these embodiments, after the position change, an image 352 taken by rear camera 106 before the position change is optionally displayed to the user, and the user is requested to match images 354 currently acquired by front camera 104 with the displayed image. The distance is optionally calculated based on an analysis of an image acquired by front camera 104 before the position change and an image acquired by rear camera 106 acquired after the position change. In some embodiments, device 100 has screens on both sides, in which the instructions to the user are provided as appropriate on the screen facing the user.

Distance Change

In other embodiments of the invention, the instruction (212) to move mobile device 100 to the new position, includes an instruction to change the distance between the mobile device and the user (e.g., the user's face), by moving the device closer to the user or farther from the user.

Figure 4:
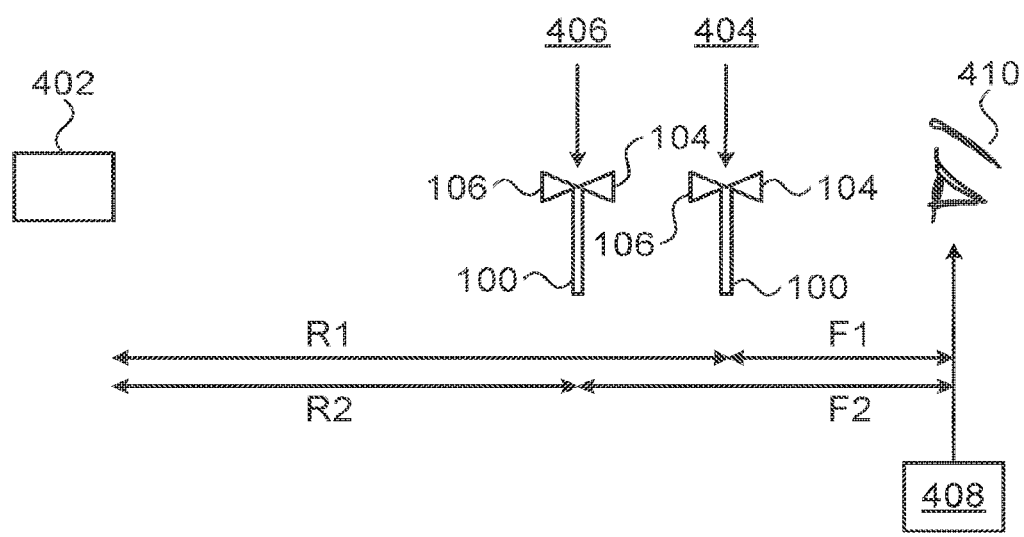
FIG. 4 is a schematic diagram of a calculation of the distance to an object based on images acquired from two different positions, in accordance with an embodiment of the invention.

FIG. 4 is a schematic illustration of distance measurement to an object 402, in accordance with an embodiment of the invention.

Optionally, in both the original position (e.g., 404) and the position after the change (e.g., 406), front camera 104 acquires an image including a specific body portion (e.g., 410). The instruction (212) to the user optionally states that the image acquired by front camera 104 should include the body portion 410, and possibly includes an instruction to keep the body portion 410 in a central portion of the image. Alternatively or additionally, the user is instructed to aim the camera such that the body portion is located in the same relative location within the image acquired after the position change, as before the position change. The body portion optionally includes the human cornea, although other body organs having a nearly fixed size for different people may be used. In some embodiments, a plurality of different body portions may be considered and the distance is determined based on a weighted sum of the distance calculated for each body portion.

Alternatively or additionally, processor 110 is configured with the size of the body portion in an initialization stage and thereafter the configured size is used in a plurality of subsequent distance measurements performed by the user. The configured size may be entered manually by the user, based on a measurement performed without use of device 100, or may be performed using device 100, for example in a configuration procedure including acquiring images of the body portion from one or more predetermined distances and/or acquiring a plurality of images from different distances with known relative locations.

Alternatively or additionally to using a body portion, front camera 104 is aimed at an object having a known size, such as a ruler, coin or money note. In some embodiments of the invention, the known-size object is included in the images acquired before and after the position change. In other embodiments, the known-size object is placed by the user next to the body portion, so that the size of the body portion can be determined from the known-size object. In these embodiments, the known-size object may appear in only some of the images acquired.

The change in position is optionally determined (222) in these embodiments, based on a comparison of the size of the imaged body portion 410 in the front images before and after the position change (Front1, Front2). Optionally, processor 110 counts the number of pixels over which the cornea (or other specific body organ) spans in image Front1 and according to the known width of the cornea and the field of view (iFov) of front camera 104, calculates the distance (F1) between device 100 and the user at the time the image Front1 was acquired. Optionally, the width of the cornea is evaluated as the white to white corneal diameter. Optionally, the distance between front camera 104 and the user (F1) is calculated as:

$$F1 = \text{SizeOfCorneaInMeters} / (\text{iFovInRadiansToPixel} * \text{SizeOfCorneaInPixels})$$

Processor 110 optionally additionally determines the size ratio of the cornea and/or other body portions between Front1 and Front2, referred to herein as FrontZoom and the size ratio of one or more features between Rear1 and Rear2, referred to herein as RearZoom. The one or more features used in calculating RearZoom are optionally selected using known methods of feature detection, matching and/or tracking, such as optical flow, speeded up robust features (SURF) and/or scale invariant feature transform (SIFT).

The distance to the object from device 100 before the position change is optionally estimated (224) as:

$$R1 = F1 * (\text{FrontZoom} - 1) / (1 - \text{RearZoom})$$

Alternatively or additionally, the calculation includes determining the new distance (F2) between user 408 and device 100, after the position change, in a manner similar to the calculation of F1, F2 may then be used to calculate FrontZoom and/or R2.

Alternatives

Device 100 in some of the above embodiments is assumed to be rigid, at least in portions on which cameras 104 and 106 are mounted, such that the relative positions of the cameras does not change. In other embodiments, device 100 may be flexible and/or cameras 104 and/or 106 are movably mounted on device 100, such that the relative positions of the cameras on device 100 may change. In such embodiments, processor 110 is optionally configured to receive information on the pose of device 100, which pose information includes not only the location and orientation of device 100, but also the relative locations of cameras 104 and 106 on device 100.

In the above description, device 100 is assumed to be held by a user and the instructions as to changing the position of the device are provided to the user. In other embodiments, device 100 is mounted on a tripod, arm or other mount which includes a motor or other device which controls its movement. The mount is configured to receive movement instructions directly from device 100, such that the entire method of FIG. 2 is carried out automatically without human aid. Such a setup may be used, for example, for surveillance purposes.

CONCLUSION

It will be appreciated that the above described methods may be varied in many ways, including, changing the specific elements used and their layout and changing the order of acts in the methods. It should also be appreciated that the above described description of methods and apparatus are to be interpreted as including apparatus for carrying out the methods and methods of using the apparatus. The present invention has been described using non-limiting detailed descriptions of embodiments thereof that are provided by way of example and are not intended to limit the scope of the invention. Many specific implementation details may be used.

It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art. Furthermore, the terms "comprise." "include." "have" and their conjugates, shall mean, when used in the claims, "including but not necessarily limited to."

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims.

What is claimed is:

1. A method of measuring a distance to an object, by a device having at least two cameras, comprising:
   acquiring, by a first camera of the device while the device is in a first position, one or more first images that include the object;
   acquiring, by a second camera of the device while the device is in the first position, one or more first reference images:
   after acquiring the one or more first images, displaying, to a user, a stop instruction in response to a numerical score exceeding a dynamically adjustable threshold, the numerical score indicating an extent of matching between the one or more first reference images and a current image acquired by the second camera, and the dynamically adjustable threshold being according to an accuracy level for distance determination;
   acquiring, by the first camera of the device while the device is in a second position, one or more second images including the object;
   acquiring, by the second camera of the device while the device is in the second position, one or more second reference images;
   determining, based on the one or more first and second reference images, information on a displacement of at least one camera of the device between the first and second positions; and
   calculating the distance from the device to the object, based on the one or more first and second images including the object and the determined information on the displacement of the at least one camera, the calculation based on a fixed measurement.

2. The method of claim 1, wherein acquiring the one or more first images including the object comprises acquiring a plurality of images while the device is in the first position and generating a single image including the object from the plurality of acquired images.

3. The method of claim 2, wherein generating the single image including the object from the plurality of acquired images comprises selecting one of the plurality of acquired images.

4. The method of claim 2, wherein generating the single image including the object from the plurality of acquired images comprises generating a combination of some or all of the plurality of acquired images.

5. The method of claim 2, wherein generating the single image including the object from the plurality of acquired images comprises analyzing quality of the plurality of acquired images and discarding images of a quality below a given threshold.

6. The method of claim 1, comprising displaying to the user instructions directing to change a position of the device to the second position, after acquiring the one or more first images.

7. The method of claim 1, wherein the fixed measurement comprises a size of a body organ and wherein the body organ is included in the one or more first and second reference images.

8. The method of claim 7, wherein the body organ comprises a cornea.

9. The method of claim 1, wherein the fixed measurement comprises the distance between the first and second cameras of the at least two cameras.

10. The method of claim 1, wherein the first and second cameras of the at least two cameras are on opposite sides of the device.

11. The method of claim 1, wherein the one or more first images including the object and the one or more first reference images are acquired in pairs of reference and object images, the reference and object images of each pair being acquired concurrently.

12. A device, comprising:
    a housing;
    a display;
    a first camera included in the housing;
    a second camera included in the housing; and
    a processor, included in the housing, configured to:
       receive one or more first images including an object, acquired by the first camera while the device is in a first position;
       receive one or more first reference images acquired by the second camera while the device is in the first position;
       after acquiring the one or more first images, display, by the display of the device, a stop instruction in response to a numerical score exceeding a dynamically adjustable threshold, the numerical score indicating an extent of matching between the one or more first reference images and a current image acquired by the second camera, and the dynamically adjustable threshold being according to an accuracy level for distance determination;
       receive one or more second images including the object acquired by the first camera while the device is in a second position;

receive one or more second reference images acquired by the second camera while the device is in the second position;

determine information on a displacement of at least one camera of the device between acquiring the one or more first images and acquiring the one or more second images, responsively to the one or more first and second reference images; and calculate a distance from the device to the object based on the one or more first and second images and the determined information on the displacement of the at least one camera, the calculation based on a fixed measurement.

13. The device according to claim 12, wherein the first and second cameras are on opposite sides of the housing.

14. The device according to claim 12, wherein the processor is configured to control the first and second cameras to acquire the one or more first images and the one or more first reference images in pairs of concurrently acquired images and respective reference images.

15. The device according to claim 12, comprising a screen located on a same side of the housing as the second camera.

16. The device according to claim 12, wherein the processor is configured to provide, after receiving the one or more first images and the one or more first reference images, instructions on changing a position of the housing, for acquiring the one or more second images and the one or more second reference images.

17. The device according to claim 12, wherein the processor is configured to analyze an input stream provided by the second camera relative to the one or more first reference images, after receiving the one or more first images and the one or more first reference images, in order to determine when the housing is in a position suitable for acquiring the one or more second reference images and the one or more second images.

18. The device according to claim 12, comprising a screen and wherein the processor is configured to display on the screen, after receiving the one or more first images and the one or more first reference images, a stream of images acquired by the second camera, in order to allow a user to position the housing for acquiring the one or more second images and the one or more second reference images.

19. The device according to claim 12, wherein the processor is configured to determine an extent of relative rotation between the one or more first and second reference images and use the determined extent of relative rotation in determining the information on the displacement of the at least one camera between acquiring the one or more first images and acquiring the one or more second images.

20. A computer program product for distance estimation, comprising:

a computer readable non-transitory storage medium having computer readable program code embodied therewith, which when executed by a computer performs:

receiving one or more first images including an object acquired by a first camera of a device while the device is in a first position;

receiving one or more first reference images acquired by a second camera while the device is in the first position;

after acquiring the one or more first images, display, by a display of the device, a stop instruction in response to a numerical score exceeding a dynamically adjustable threshold, the numerical score indicating an extent of matching between the one or more first reference images and a current image acquired by the second camera, and the dynamically adjustable threshold being according to an accuracy level for distance determination;

receiving one or more second images including the object acquired by the first camera while the device is in a second position;

receiving one or more second reference images acquired by the second camera while the device is in the second position;

determining, based on the one or more first and second reference images, information on a displacement of at least one camera of the device between acquiring the one or more first and one or mom second reference images; and calculating a distance from the device to the object, based on the one or more first and second images including the object and the determined information on the displacement of the at least one camera, the calculation based on a fixed measurement.

* * * * *

UNITED STATES PATENT AND TRADEMARK OFFICE
CERTIFICATE OF CORRECTION

PATENT NO. : 10,691,967 B2
APPLICATION NO. : 16/591292
DATED : June 23, 2020
INVENTOR(S) : Zak et al.

Page 1 of 1

It is certified that error appears in the above-identified patent and that said Letters Patent is hereby corrected as shown below:

In the Claims

In Column 11, Line 47, in Claim 1, delete "images:" and insert --images;-- therefor In Column 14, Line 36, in Claim 20, after "and", delete "one or mom"

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*